United States Patent [19]

Crosier

[11] Patent Number: 5,683,778
[45] Date of Patent: Nov. 4, 1997

[54] BRAIDED GRAPHITE-FOIL AND METHOD OF PRODUCTION

[76] Inventor: Robert A. Crosier, 7620 Mariner Cove Dr., Huntersville, N.C. 28078

[21] Appl. No.: 729,793

[22] Filed: Oct. 8, 1996

Related U.S. Application Data

[63] Continuation of Ser. No. 324,703, Oct. 18, 1994, abandoned, Continuation-in-part of Ser. No. 987,640, Dec. 9, 1992, abandoned.

[51] Int. Cl.$^6$ ............................................. D02G 3/00
[52] U.S. Cl. ............................ 428/59; 428/225; 428/364; 428/376; 428/377; 264/29; 264/29.2; 264/63; 264/104; 57/231; 57/232
[58] Field of Search ........................... 428/224, 408, 428/377, 225, 364, 229, 375, 376; 252/502, 511; 423/448, 460

[56] References Cited

U.S. PATENT DOCUMENTS

| | | | |
|---|---|---|---|
| 1,137,373 | 4/1915 | Aylsworth . | |
| 1,191,383 | 7/1916 | Aylsworth . | |
| 2,072,543 | 3/1937 | Crane | 277/229 |
| 2,372,645 | 4/1945 | Barmack | 156/438 |
| 2,664,374 | 12/1953 | Slayter | 156/178 |
| 2,813,051 | 11/1957 | MacHenry | 154/90 |
| 3,011,933 | 12/1961 | Barnes | 156/201 |
| 3,332,138 | 7/1967 | Garner | 156/54 |
| 3,333,941 | 8/1967 | Olstowski | 71/39 |
| 3,379,821 | 4/1968 | Garner | 156/54 |
| 3,389,964 | 6/1968 | Olstowski | 23/209.1 |
| 3,404,061 | 10/1968 | Shane | 161/125 |
| 3,409,563 | 11/1968 | Olstowski | 252/506 |

(List continued on next page.)

FOREIGN PATENT DOCUMENTS

| | | | |
|---|---|---|---|
| 149832 | 6/1951 | Australia | 156/56 |
| 797144 | 10/1963 | Canada | 23/303 |
| 2647802 | 12/1990 | France | 156/201 |
| 1012349 | 7/1957 | Germany | 156/54 |
| 153749 | 1/1982 | Germany | 156/54 |
| 21788 | 2/1978 | Japan | 156/54 |
| 42388 | 4/1978 | Japan | 156/176 |

OTHER PUBLICATIONS

Crosier, Robert A.; *National Engineer*; "Braided Graphite Foil: The Asbetos Alternative;" Jan., 1992; pp. 7–11.

Gibson, Sr., Vernon W.; Disclosure Document 083086; "Compression Packing and Processs of Forming Same;" Aug. 7, 1979.

A flyer by the Slade Company discloses a fire resistant packing material designated "Slade Foil."

A test report by the Southwest Research Institute entitled "Fire Test for Evaluation of Valve Stem Packing;" Jun. 17, 1994.

A test report by the Southwest Research Institute entitled "Fire Test for Evaluation of Valve Stem Packing;" Jul. 21, 1994.

A test report entitled "The Cambridge Report of VOC Valve Emissions."

A test report entitled "The Cambridge Performance Report of VOC Valve Emissions"; May 25, 1994.

*Primary Examiner*—Merrick Dixon
*Attorney, Agent, or Firm*—Dougherty & Associates

[57] ABSTRACT

An improved method and apparatus for the production of a strand of reinforced graphite-foil yarn which is the basis of the braided graphite-foil yarns. To produce the reinforced graphite-foil strands what is needed is apparatus for a tapered, cone shaped circular die having a specific geometry suitable for curling the fiber and adhesive coated surface inward upon itself, so that the curled ribbon will adhere to itself when compressed into the final protrusion die forming a finished fiber reinforced composite strand of expanded graphite flake having suitable tensile strength, flexibility, and toughness to permit braiding, weaving and other processing making it commercially useful wherever a dry, lubricous, strong, flexible material is desirable.

13 Claims, 5 Drawing Sheets

U.S. PATENT DOCUMENTS

| | | | |
|---|---|---|---|
| 3,414,381 | 12/1968 | Olstowski | 23/209.1 |
| 3,475,244 | 10/1969 | Sanders | 156/83 |
| 3,492,197 | 1/1970 | Olstowski | 161/183 |
| 3,494,382 | 2/1970 | Shane | 138/129 |
| 3,723,157 | 3/1973 | Druin | 117/46 |
| 3,885,007 | 5/1975 | Olsen | 264/42 |
| 4,093,480 | 6/1978 | Blalock | 156/54 |
| 4,146,401 | 3/1979 | Yamada | 106/56 |
| 4,151,031 | 4/1979 | Goad | 156/201 |
| 4,270,963 | 6/1981 | Howat | 156/201 |
| 4,360,395 | 11/1982 | Suzuki | 156/54 |
| 4,443,277 | 4/1984 | Rokas | 156/50 |
| 4,484,574 | 11/1984 | Derusha | 156/238 |
| 4,645,549 | 2/1987 | Lalor | 156/467 |
| 4,961,988 | 10/1990 | Zhu | 428/229 |
| 5,134,030 | 7/1992 | Ueda | 428/365 |
| 5,225,262 | 7/1993 | Leduc | 428/75 |

BRAIDED GRAPHITE-FOIL AND METHOD OF PRODUCTION

CROSS-REFERENCE TO RELATED APPLICATIONS

This is a continuation application of U.S. patent application Ser. No. 08/324,703, filed Oct. 18, 1994 now abandoned, which is a continuation-in-part application of U.S. patent application Ser. No. 07/987,640, filed Dec. 09, 1992, and now abandoned.

FIELD OF THE INVENTION

The present invention relates to a reinforced vermiculated graphite textile yarn and a method for its production. For a number of years, it has been expected that braided graphite-foil yarns would become commercially viable and available. However, a method of manufacturing a low cost fiber reinforced, vermiculated natural flake graphite textile yarn suitable for braiding, weaving, twisting, and other common textile processing has been elusive, until now.

BACKGROUND OF THE INVENTION

For many years asbestos has played an important role as a mechanical packing material. After centuries of faithful service, asbestos now is shunned because of its toxicity and carcinogenic nature. In high temperature applications, it has been difficult to find a substitute that will work as well as asbestos and still be cost effective.

Cables of braided graphite yarns have shown promise as offering an effective substitute for asbestos. The best of these yarns, however, have not fulfilled their promise. The reason for this is that existing methods of production have compromised the structural integrity of the braided yarn in order to produce a reinforced graphite strand. Reinforced strands of graphite are the key to an effective braided graphite yarn.

Yarns intended for braiding, weaving and other textile processes which may be formed from the reinforcing fibers are jacketed with vermiculated natural flake graphite (vermiculated graphite was first described in Aylsworth Patent numbers: U. S. Pat. Nos. 1,137,373 of Apr. 27, 1915 and 1,191,383 of Jul. 18, 1916) Braiding of graphite yarns is discussed in Shane et al U.S. Pat. No. 3,404,382 and 3,494,382. Unfortunately, a practical, low cost method of fabricating these yarns from commercially available graphite sheet material had not become commercially practical. The wrapping method described in the above patents was not commercially implemented because it was destructive to the graphite material and therefore it never could be manufactured in the manner in which it was proposed in the patents.

While other references, particularly Ueda U.S. Pat. No. 5,134,030 and Leduc U.S. Pat. No. 5,225,262, show a finished end product of similar appearance to the present invention, they are made in a very different manner. Both Ueda and Leduc overknit Inconel wire about their graphite to keep it together and give it the flexibility to be braided into a final form. This overknitting limits effectiveness at high temperatures in that the overknitted reinforcement degrades leaving passageways through the graphite where vapors may escape. Even when this product is used at lower temperatures, flexing overknitted packing can cause the metal wire to be impressed into the graphite which creates passageways in the graphite through which vapors might escape. Further, overknitting puts metal wire on the outside of the graphite where it has the potential to score expensive machined shafts on which it is used.

DESCRIPTION OF RELATED ART

Applicant is aware of the following U.S. and foreign patents concerning methods of producing long continuous articles employing dies and adhesives, as well as the following listed articles, reports, and sales brochures.

| U.S. Pat. No. | Issue Date | Inventor | Title |
|---|---|---|---|
| 1,137,373 | 04-27-1915 | Aylsworth | EXPANDED GRAPHITE AND COMPOSITION THEREOF |
| 1,191,383 | 07-18-1916 | Aylsworth | EXPANDED GRAPHITE |
| 2,072,543 | 03-02-1937 | Crane | PACKING |
| 2,372,645 | 04-03-1945 | Barmack | GUIDE FOR APPLYING INSULATION TO CONDUCTORS |
| 2,664,374 | 12-29-1953 | Slayter | PROCESS FOR FABRICATING STRANDS, CORDS, TUBES, AND THE LIKE |
| 2,813,051 | 11-12-1957 | MacHenry | METHOD OF PRODUCING AN ABSORBENT ELEMENT FOR FILTERS |
| 3,011,933 | 12-05-1961 | Barnes | FOIL-COVERED ELONGATED MEMBER |
| 3,332,138 | 07-25-1967 | Garner | METHOD AND APPARATUS FOR MAKING PRECISION SIZED TUBING |
| 3,333,941 | 08-01-1967 | Olstowski | ACID-WETTED EXPANDABLE PHOSPHOROUS CONTAINING GRAPHITE COMPOSITION AND METHOD OF PREPARATION |
| 3,379,821 | 04-23-1968 | Garner | SHIELDED ELECTRICAL CABLE |
| 3,389,964 | 06-25-1968 | Olstowski | PROCESS FOR PREPARING LOW DENSITY GRAPHITE STRUCTURES |
| 3,404,061 | 10-01-1968 | Shane | FLEXIBLE GRAPHITE MATERIAL OF EXPANDED PARTICLES COMPRESSED TOGETHER |
| 3,409,563 | 11-05-1968 | Olstowski | HYPERCONDUCTIVE GRAPHITE STRUCTURES |
| 3,414,381 | 12-03-1968 | Olstowski | METHOD FOR PRODUCING LOW DENSITY GRAPHITE STRUCTURES |
| 3,475,244 | 10-28-1969 | Sanders | BONDING OF COMPRESSED GRAPHITE STRUCTURES |
| 3,492,197 | 01-27-1970 | Olstowski | NOVEL COMPRESSED COHERRED GRAPHITE STRUCTURES AND METHOD OF PREPARING SAME |
| 3,494,382 | 03-10-1970 | Shane | CHEMICAL PRODUCTS AND PROCESSES |
| 3,723,157 | 03-27-1973 | Druin | PRODUCTION OF RESIN IMPREGNATED FIBROUS GRAPHITE RIBBONS |
| 3,885,007 | 05-20-1975 | Olsen | PROCESS FOR EXPANDING PYROLYTIC GRAPHITE |
| 4,093,480 | 06-06-1978 | Blalock | METHOD FOR MAKING ELECTRICAL CONNECTORS |
| 4,146,401 | 03-27-1979 | Yamada | GRAPHITE MATERIAL HAVING COMPRESSIBILITY AND RECOVERING PROPERTY AND METHOD FOR MANUFACTURING THE SAME |
| 4,151,031 | 04-24-1979 | Goad | APPARATUS FOR CONTINUOUSLY FORMING |

-continued

| | | | |
|---|---|---|---|
| 4,270,963 | 06-02-1981 | Howat | COMPOSITE SHAPES WRAPPING ARTICLES OF INDEFINITE LENGTH |
| 4,360,395 | 11-23-1982 | Suzuki | METHOD FOR PRODUCING A LAMINATED SHEATH |
| 4,443,277 | 04-17-1984 | Rokas | METHOD OF MAKING A TELECOMMUNICATIONS CABLE FROM A SHAPED PLANAR ARRAY OF CONDUCTORS |
| 4,484,574 | 11-27-1984 | DeRusha | SELF-ROLLED FOAM TAPE WITHOUT RELEASE LAYER AND METHOD OF MAKING SAME |
| 4,645,549 | 02-24-1987 | Lalor | COMPOSITE TAPES AND APPARATUS FOR WINDING COMPOSITE TAPES |
| 4,961,988 | 10-09-1990 | Zhu | GENERAL PACKING OF EXPANDED GRAPHITE |
| 5,134,030 | 07-28-1992 | Ueda | PACKING MATERIAL AND PACKING MADE OF THE SAME |
| 5,225,262 | 07-06-1993 | Leduc | BRAIDED HIGH-TEMPERATURE PACKING COMPRISING A CORE OF FOLDED FLEXIBLE GRAPHITE SHEET |

| Foreign Patents | Issue Date | Country | Title |
|---|---|---|---|
| 21,788 | 02-28-1978 | Japan | METHOD AND APPARATUS FOR PREPARING CABLE OF WATER-PROOF |
| 42,388 | 04-17-1978 | Japan | METHOD OF MANUFACTURING WATER-PROOF CABLE |
| 149,832 | 06-07-1951 | Australia | IMPROVEMENTS IN OR RELATING TO ASBESTOS INSULATED CONDUCTOR AND METHOD AND APPARATUS FOR MAKING THE SAME |
| 153,749 | 01-27-1982 | Germany | INSULATION OF SMALL DIAMETER CABLE CORE |
| 797,144 | 10-22-1963 | Canada | GRAPHITE ARTICLES AND PROCESS |
| 1,012,349 | 07-18-1957 | Germany | PROCESS FOR THE PRODUCTION OF AN ELECTRICAL CABLE |
| 2,647,802 | 12-07-1990 | France | COVERING TUBULAR ARTICLES WITH LAYER OF MATERIAL |

OTHER PRIOR ART

Crosier, Robert A.; *National Engineer*, "Braided Graphite Foil: The Asbestos Alternative"; January, 1992; pages 7-11.

Gibson, Sr., Vernon W.; Disclosure Document 083086; "COMPRESSION PACKING AND PROCESS OF FORMING SAME"; Aug. 7, 1979.

A flyer by the Slade Company discloses a fire resistant packing material designated "SLADE FOIL".

A test report by the Southwest Research Institute entitled "Fire Test for Evaluation of Valve Stem Packing"; Jun. 17, 1994.

A test report by the Southwest Research Institute entitled "Fire Test for Evaluation of Valve Stem Packing"; Jul. 21, 1994.

A test report entitled "The Cambridge Report of VOC Valve Emissions".

A test report entitled "The Cambridge Performance Report of VOC Valve Emissions"; May 25, 1994.

Aylsworth U.S. Pat. No. 1,137,373 teaches a novel form of graphite and a process for its production. This invention changes the physical orientation of flake graphite so that the flake graphite is greatly expanded in volume after treatment of the myriad of small leaves, which each flake is composed, opened up and separated like leaves of an open or partly open book. These leaves however, are not completely separated from one another. The separation is accomplished by the entrapment of gas or air between the leaves of the expanded flakes, resulting in a graphite of reduced specific gravity and vastly increased bulk or volume.

Aylsworth U.S. Pat. No. 1,191,383 teaches the use of expanded graphite from Aylsworth U.S. Pat. No. 1,137,373 compounded with a binder and other substances which can then be molded in various forms.

Crane U.S. Pat. No. 2,072,543 provides an improved packing fibrous material and method of fluid-tight packing as used in pumps and the like.

Barmack U.S. Pat. No. 2,372,645 provides a method for applying insulation to electrical conductors such as wires and cables. The tape form of insulation is applied so as to embrace the conductor as a sheath.

Slayter U.S. Pat. No. 2,664,374 teaches a method for the fabrication of strands, cords, tubes and improved products.

Barnes U.S. Pat. No. 3,011,933 provides a method of producing a foil-covered elongated member in the form of a wire or tube having an external straight line, longitudinal seam. A plurality of forming rolls is employed to shape the foil sheet into a generally tubular element having a U-shaped cross-section.

Garner U.S. Pat. No. 3,332,138 teaches a method and apparatus for making precision sized tubing. This process involves forming the coated metal strip into a longitudinally seamed tube with a lapped seam and extruding a seamless plastic jacket over the outside of the formed tube.

Olstowski U.S. Pat. No. 3,333,941 teaches a method to make a heat expandable composition. The expanded graphite material may be used as a flame retarding agent and is useful as a mulch agent.

Garner U.S. Pat. No. 3,379,821 provides a cable with aluminum or other metal shielding strip pre-coated with special adhesive polyethylene with the outer polyethylene jacket extruded under such temperature and pressure conditions so as to obtain firm adhesion over a portion only of the interface between the extruded jacket and the coated shielding layer.

Olstowski U.S. Pat. No. 3,389,964 teaches a method of producing relatively low density graphite structures from compressed vermicular graphite.

Shane U.S. Pat. No. 3,404,061 teaches a novel form of graphite and a process of producing the same. Shane further shows that threads or yarns can be woven, braided or otherwise worked into the thin, flat, flexible graphic sheet material.

Olstowski U.S. Pat. No. 3,409,563 teaches a process for producing hyperconductive graphite structures by contacting vermicular expanded graphite with a fluid intercalation agent.

Olstowski U.S. Pat. No. 3,414,381 provides a process for producing graphite structures using low temperature for reexpanding compressed vermicular graphite.

Sanders U.S. Pat. No. 3,475,244 teaches a process for pressure-bonding compressed vermicular graphite structures to other relatively dense structures. The graphite is treated with a reexpanding agent and heated and pressed to the structure for bonding.

Olstowski U.S. Pat. No. 3,492,197 teaches a method for preparing graphite by compressing expanded vermicular graphite having a bulk of from about 0.2 to 2 pounds per foot$^3$ into cohered forms.

Shane U.S. Pat. No. 3,494,382 teaches a tubular article comprising overlying layers of graphite material. The graphite is characterized by being composed of graphite particles which have been expanded at least 80 times and then recompressed into an integral mass. Shane also discloses that flexible graphite web materials can be produced and that it is desirable to reinforce the graphite sheets with filaments.

Druin U.S. Pat. No. 3,723,157 teaches the production of resin impregnated fibrous graphite ribbons. Uniform multi-filament bundles of a fibrous material are fed through a graphitization zone at elevated temperatures resulting in the conversion of the fibrous material to graphite carbon.

Olsen U.S. Pat. No. 3,885,007 provides a method to make an uniformly expanded pyrolytic graphite. The pyrolytic graphite is expanded in a controlled manner to form an integral bonded expanded pyrolytic graphite.

Blalock U.S. Pat. No. 4,093,480 teaches a method and apparatus for manufacturing electrical connectors, which comprise of a cylindrical elastomeric body having a flexible film wrapped around it.

Yamada U.S. Pat. No. 4,146,401 provides acid-treated and water-washed graphite particles which are pressure-molded. The treated particles combine with the original particles to obtain a graphite material which is suitable for use in making gaskets, packings, heat insulators, and cushion elements which are resistant to oxidation and serviceable at high temperatures.

Goad U.S. Pat. No. 4,151,031 teaches an apparatus for continuously forming composite shapes. Goad's apparatus locally heats a fiber-reinforced thermoplastic tape, gradually forms the strip along lines parallel to the length of the strip, then cools the strip while maintaining the desired shape. Further Goad teaches the use of a resin/graphite composite. While the end product of Goad is an I beam, the teaching of joining composites together with adhesives may be important.

Howat U.S. Pat. No. 4,270,963 teaches a method of wrapping articles of indefinite length. A cable or optical fiber is wrapped in material by progressively pressing the wrapping material along a narrow width portion to the cable, then succeeding width portions are also turned around the article and pressed against it. Howat combines a tape, an adhesive and fibers.

Suzuki U.S. Pat. No. 4,360,395 teaches a method for producing a laminated sheath product. A tape is longitudinally supplied into a first die to shape the tape to a particular tubular form. Then, the tape passes through a second die while adhesive is being applied.

Rokas U.S. Pat. No. 4,443,277 provides a method of producing telecommunications cable by locating a plurality of conductors in a group in an open array and shaping the group into arcuate configuration. The group of conductors is then wrapped in a layer of insulation.

DeRusha U.S. Pat. No. 4,484,574 provides a pressure-sensitive tape, which is formed into a roll. The tape may be unwound without disturbing the adhesiveness of the layers.

Lalor U.S. Pat. No. 4,645,549 provides a composite tape and a method of winding the tape on a spool. This tape is used primarily in transformer winding as an electric screen.

Zhu US Pat. No. 4,961,988 teaches a packing of expanded graphite and the process for production thereof. The packing mainly includes vermiform laminae of expanded graphite and auxiliary materials, which is characterized by embedment of the auxiliary materials into the vermiform graphite laminae and the bond of the auxiliary materials to the vermiform graphite laminae with organic adhesives. In processing the graphite Zhu teaches the creation of a sheet of graphite with a resinous material which is subsequently reinforced with fibers. The problem here is that the resin volatilizes at high temperature and a significant volume of the mass turns to ash causing it to lose volume and cohesion. This means the material cannot be removed with standard extraction tools and must be picked out of the cavity.

Ueda U.S. Pat. No. 5,134,030 teaches packing material made from flexible graphite sheets. A cord-like structure is produced from flexible graphite sheets cut to a width of less than 5 mm which is then twisted or braided. The flexible graphite is laminated with at least one reinforcing fiber material or foil and the surface is covered with a fiber material to achieve a synergistic action of the fiber material, flexible graphite sheet and the reinforcing fiber or foil material. Ueda teaches the equivalent of putting graphite strips into a sock and compressing it. When this material is used as a gasket with volatile hydrocarbons, the hydrocarbon molecules have a porous path to follow, preventing effective sealing. Ueda teaches, in Column 1, lines 43–47, that flexible graphite cannot be braided or knitted.

Leduc U.S. Pat. No. 5,225,262 provides a method of packing which comprises of a core of folded flexible graphite sheet. This sheet has a plurality of strands and is over-knitted with a reinforcing wire. Leduc also teaches corrugating the graphite before sending. Any binding of a graphite ribbon without corrugation goes against the teaching of Leduc.

Japanese Patent 21,788 teaches a method for treating the cable to water-proof the core. The water-proof is made an intricate part of the laminated tape to prevent separation.

Japanese Patent 42,388 teaches an improved method of treating the cable to increase the amount of water-proof to occupy the entire space between the cable core and the metal tape.

Australian Patent 149,832 teaches a method of applying asbestos as an insulation material for electrical conductors.

German Patent 153,749 provides insulation which is folded and is reduced in size through a series of steps.

Canadian Patent 797,144 provides a method to make pyrolytic graphite which has an expanded structure.

German Patent 1,012,349 teaches a method of producing an electrical cable by pressing and rotating the wire. The wire is then dried and separated from the water vapor. The wire is then condensed to obtain the finished product.

French Patent 2,647,802 teaches a method of fixing supple material strip without stitching or obvious joints.

"Braided Graphite Foil: The Asbestos Alternative" teaches the advantages of using braided graphite foil as a packing material over the use of asbestos and other asbestos alternative substances.

"COMPRESSION PACKING AND PROCESS OF FORMING SAME" provides a method of braiding graphite ribbon or tape using a plurality of graphite ribbons. A combination of flexible graphite ribbon and tensile graphite ribbon is used to allow for braiding and to retain strength of the packing material.

A flyer by the Slade Company discloses a fire resistant packing material designated "SLADE FOIL" which provides test results of SLADE FOIL. These test results reflect that SLADE FOIL exceeds the 1997 EPA standards.

A test report by the Southwest Research Institute entitled "Fire Test for Evaluation of Valve Stem Packing" provides proof that Slade 3300 GP Packings exceed performance requirements. Detailed charts provide how the averaging was achieved.

A test report by the Southwest Research Institute entitled "Fire Test for Evaluation of Valve Stem Packing" provides proof that Slade 3300 GP Packings exceed performance requirements.

A test report entitled "The Cambridge Report of VOC Valve Emissions" provides proof that Slade 3300G Packings exceed performance requirements.

A test report entitled "The Cambridge Performance Report of VOC Valve Emissions" provides proof that Slade 3300G Packings exceed performance requirements.

SUMMARY OF THE INVENTION

While cables of braided graphite have theoretically been known for years, their execution has been disappointing because the effective reinforcement of vermiculated natural flake graphite has been elusive. Specifically, the actual method of joining a ribbon of graphite to reinforcing yarns while still maintaining its extreme service temperature capability has not been possible until now. Service temperatures of from −400° F. up to 5400° F. were not possible in earlier attempts at making these yarns. It has been found that, by encapsulating the reinforcing fibers such as quartz, INCONEL™ wire, stainless steel wire, carbon fiber, graphite fiber and/or other high temperature reinforcements in a jacket of vermiculated graphite, the loss of the adhesive coating has no effect on the overall integrity of the yarns. The adhesive material, which carbonizes in the absence of oxygen (the core of the jacketed yarns are relatively oxygen free) at elevated temperatures is no longer required as an adhesive once it has been fully encapsulated and has been processed into a textile yarn. This permits the material to be used at extremely high temperatures without significant change in service capability, also the adhesive has no significant weight or volume loss effect because it has become carbon which is very suitable for the services intended.

This simple, inexpensive yarn is made by slitting a vermiculated graphite roll into ribbons having suitable widths for this purpose. The ribbons are mounted into a "protrusion" device, which is a combination extrusion/pultrusion die, wherein the workpiece is fed into the die by rollers and the product is removed by pulling from the exit end of the die. The end of the graphite ribbon is fed through a compression roller with a ribbon of two sided adhesive thin plastic film. One side is then bonded to the ribbon of graphite, the other side is intended for the reinforcing fiber. As the graphite ribbon leaves the compression rollers bonded to the adhesive strip, the protective paper or plastic is stripped, exposing the adhesive on the outside surface of the laminated ribbon to permit the reinforcing fibers to attach themselves to the adhesive surface of the laminated ribbon.

Fibrous strands are then threaded into the protrusion device to be laid up on the adhesive matrix and to become attached to the ribbon. The fiber reinforced laminated ribbon which still has exposed adhesive on the surface is then fed at a critical angle through a tapered, cone shaped circular die having a specific geometry suitable for curling the fiber and adhesive coated surface inward upon itself, so that the curled ribbon will adhere to itself when compressed into the final protrusion die forming a finished fiber reinforced composite strand of expanded graphite flake having suitable tensile strength, flexibility, and toughness to permit braiding, weaving and other processing making it commercially useful wherever a dry, lubricous, strong, flexible material is desirable.

The invention provides apparatus and a method for production of braided graphite-foil yarns. During normal operation, a ribbon of vermiculated graphite a ribbon of plastic adhesive film and a reinforcing fiber are brought together, and passed through the conical die which founds these elements onto themselves. Pressure is then applied to form a fiber reinforced composite strand of expanded graphite flake having suitable tensile strength, flexibility, and toughness to permit braiding, weaving and other processing. The present invention is particularly useful for the production of braided graphite-foil yarns.

OBJECTS OF THE INVENTION

The principal object of the invention is to provide an improved method of producing a strand of reinforced graphite-foil yarn which is the basis of the braided graphite-foil yarns.

A further object of this invention is to provide a method of curling the fiber and adhesive coated surface inward upon itself, so that the curled ribbon will adhere to itself when compressed into the final protrusion die forming a finished fiber reinforced composite strand of expanded graphite flake.

A further object of this invention is to provide a method of fully encapsulating the adhesive and reinforcing fibers, preventing these areas from becoming a leak path.

Another object of the invention is to provide a gasket made of braided graphite which can effectively replace asbestos gaskets and work effectively at temperatures at or above 2200° Fahrenheit, as well as at cryogenic temperatures.

A further object of this invention is to provide a method of fully encapsulating the adhesive protecting it from chemical exposure.

A further object of this invention is to provide a method of fully encapsulating the adhesive allowing carbonization of the adhesive when exposed to high temperatures.

Another object of the invention is to provide apparatus for a tapered, cone shaped circular die having a specific geometry suitable for curling the fiber and adhesive coated surface inward upon itself, so that the curled ribbon will adhere to itself when compressed into the final protrusion die forming a finished fiber reinforced composite strand of expanded graphite flake having suitable tensile strength, flexibility, and toughness to permit braiding, weaving or other textile processing, making it commercially useful wherever a dry lubricous, strong, flexible material is desirable.

BRIEF DESCRIPTION OF THE DRAWINGS

The foregoing and other objects will become more readily apparent by referring to the following detailed description and the appended drawings in which.

DETAILED DESCRIPTION

Figure 3:
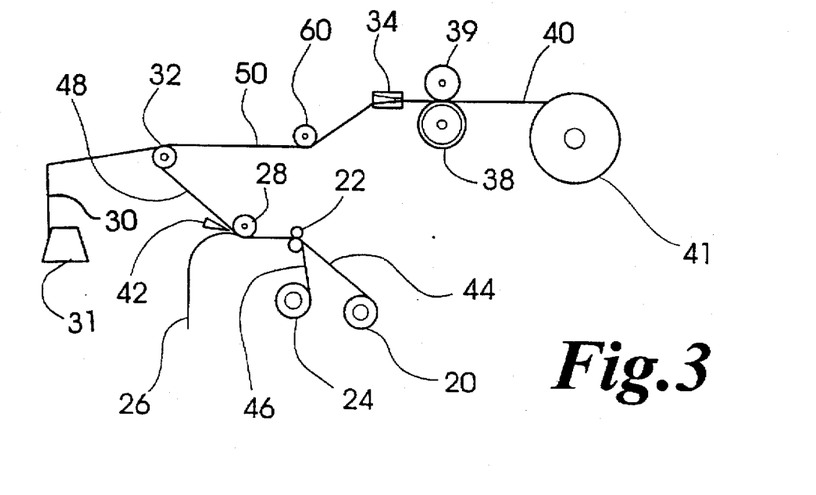
FIG. 3 is a front view illustrating the production of a strand of reinforced graphite-foil yarn which is the basis of the braided graphite-foil yarns.
Figure 4:
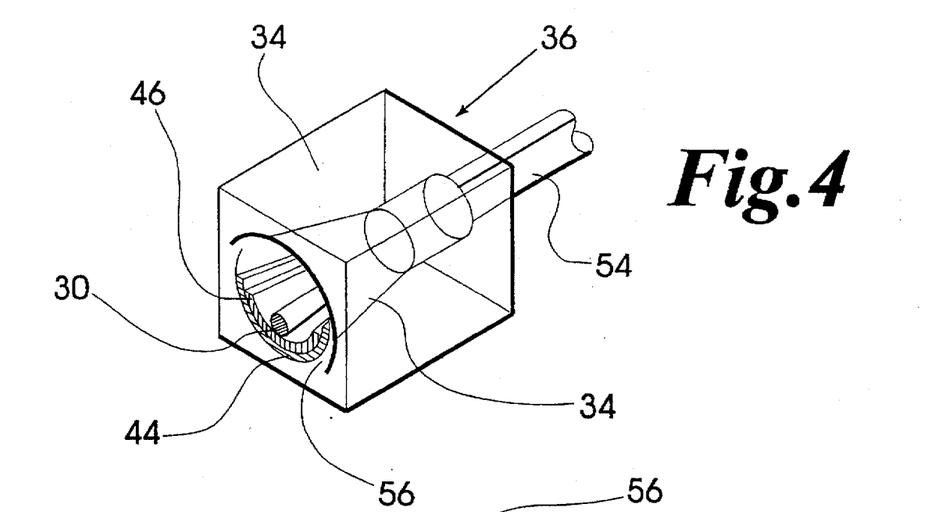
FIG. 4 is an isometric view of a cone shaped curling die illustrating the geometry of its interior.
Figure 7:
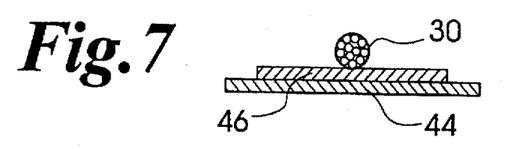
FIG. 7 is a cross section of an unprocessed portion of the reinforced graphite-foil strand.
Figures 15, 16:
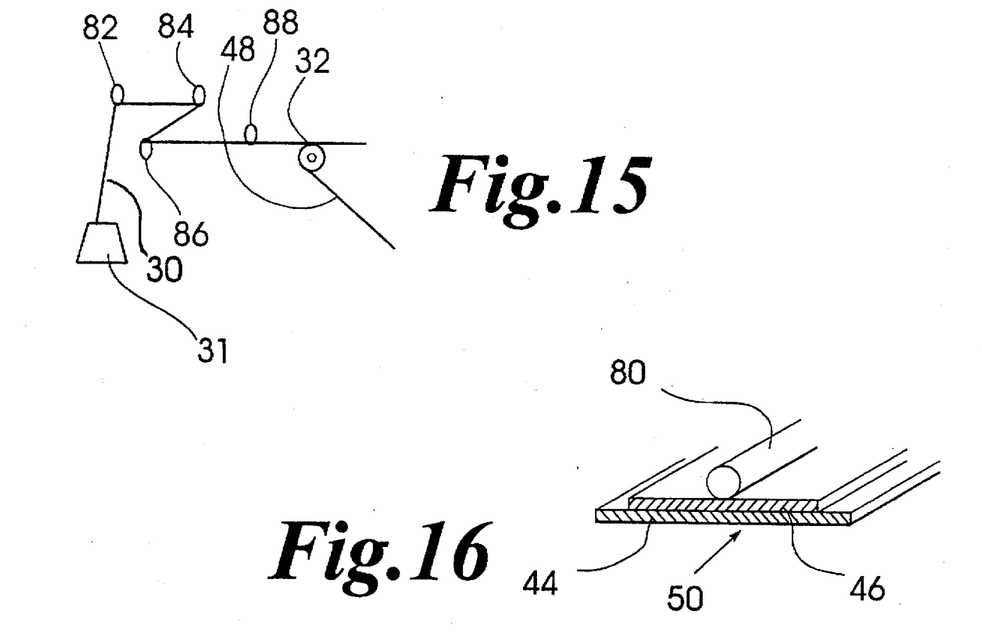
FIG. 15 is a front view of the apparatus for laying a reinforcing fiber on the combined ribbon of vermiculated graphite and adhesive.
FIG. 16 is an isometric cross sectional view of an alternative embodiment of an unprocessed portion of a reinforced graphite-foil strand.
Figure 17:
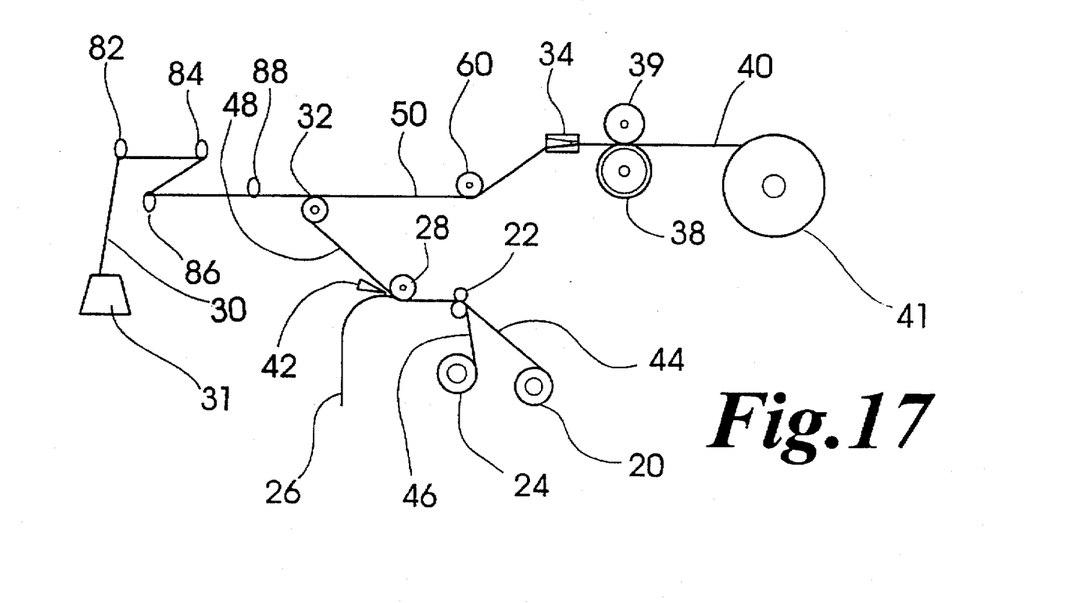
FIG. 17 is a front view illustrating an alternative embodiment for the production of a strand of reinforced graphite-foil yarn which is the basis of the braided graphite-foil yarns.

Referring now to the drawings, and particularly to FIG. 3, a simple, inexpensive yarn is made by slitting a vermiculated graphite roll 20 into ribbons having suitable widths for this purpose. While a number of widths are possible, a preferred width of the vermiculated graphite ribbon 44 is 0.375 inches wide by 0.015 inches thick, while having a length of many feet. The ribbon of vermiculated graphite 44 and a ribbon of plastic adhesive film 46, such as polyester, cellophane, or acrylic, having a protective plastic or paper strip 26 are fed through compression rollers 22. The plastic adhesive is conveniently about 0.2 inches in width with a depth of about 0.00025 inches (one-quarter mil). The ribbon of vermiculated graphite 44 is laminated in the compressive protrusion rollers 22 with a ribbon of a suitably thin plastic film 46 so the exposed side is covered with protective plastic film 26. As the ribbon leaves the compression rollers 22, the protective plastic film 26 is stripped by a peeler 42, exposing the adhesive on the outside surface of the laminated ribbon 48, after which reinforcing fibers 30 which are wound on a spool 31 are placed on and attach themselves to the adhesive surface of the laminated ribbon at roller 32. While many different means can be used to align the fibers on the laminated ribbon 48, it has been found that the use of a series of eyelets 82, 84, 86 and 88, FIG. 15, effectively aligns the fiber 30 down the center of laminated ribbon 48, as shown in FIG. 7, for further processing.

The reinforcing fiber may be made up of thousands of monofilaments. Alternatively the reinforcing fiber can be a single fiber 80, FIG. 16 or a bundle of fibers 30, FIG. 8a. The reinforcing fibers can be carbon fiber, Inconel wire, aluminum wire, steel wire, hemp, string, nylon fiber, siltemp fiber or nomex fiber or some combination of any of the above mentioned filaments. For high temperature installations use of carbon fiber is preferred.

Figures 1, 2:
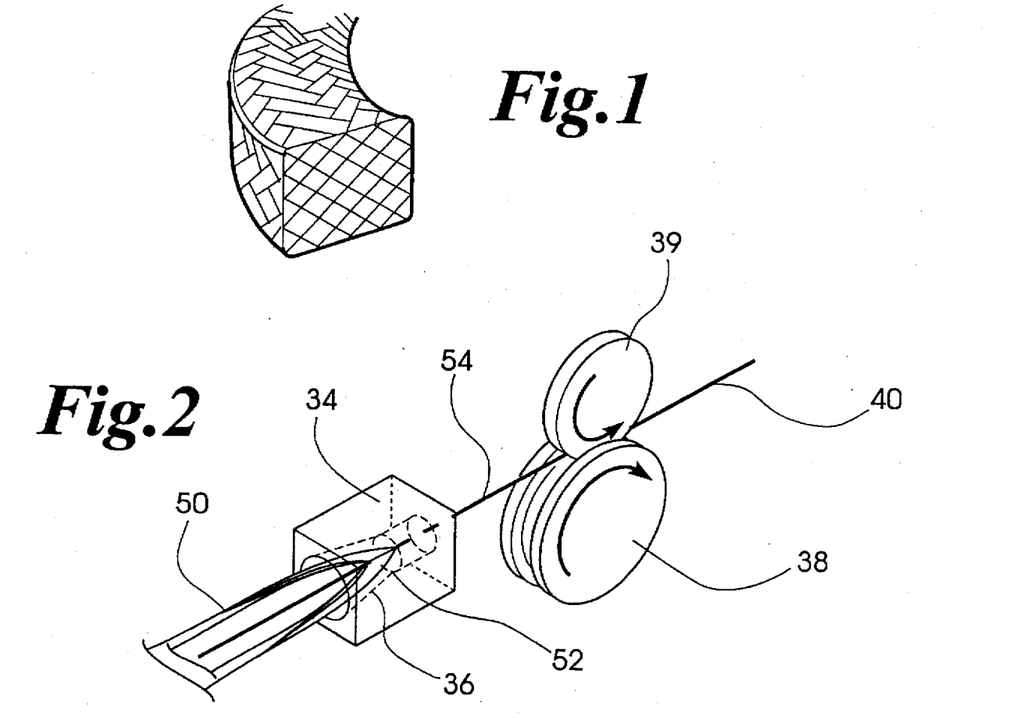
FIG. 1 is an isometric view of a portion of the braided graphite-foil yarn.
FIG. 2 is an isometric view of a portion of the cone shaped curling die and the compression die which the reinforced graphite-foil strands are passed.
Figure 5:
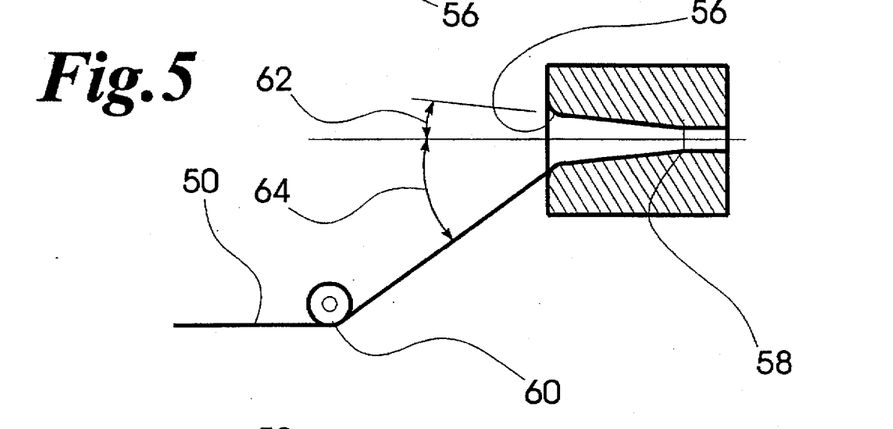
FIG. 5 is a cross sectional view of the cone-shaped curling die of FIG. 4.
Figures 8A, 8B, 8C:
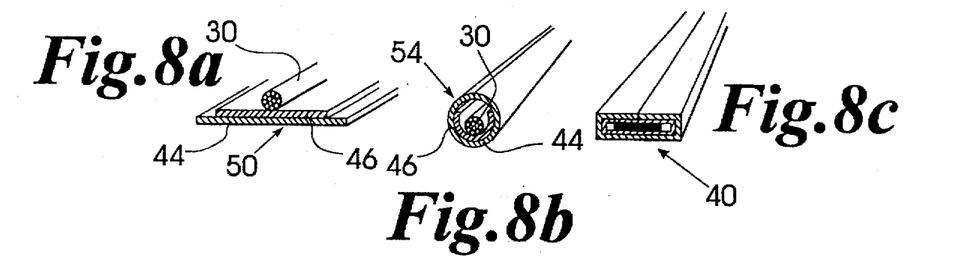
FIG. 8a is an isometric cross sectional view of an unprocessed portion of a reinforced graphite-foil strand.
FIG. 8b is an isometric cross sectional view of a partially processed graphite-foil strand.
FIG. 8c is an isometric cross sectional view of a compressed graphite-foil strand.
Figure 13:
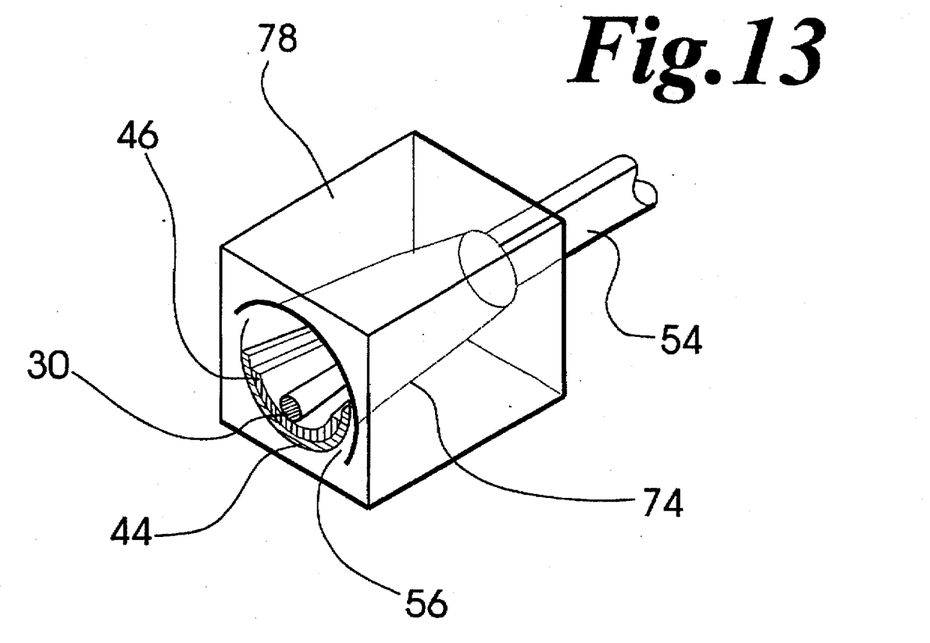
FIG. 13 is an isometric view of an alternative cone-shaped curling die illustrating the geometry of its interior.
Figure 14:
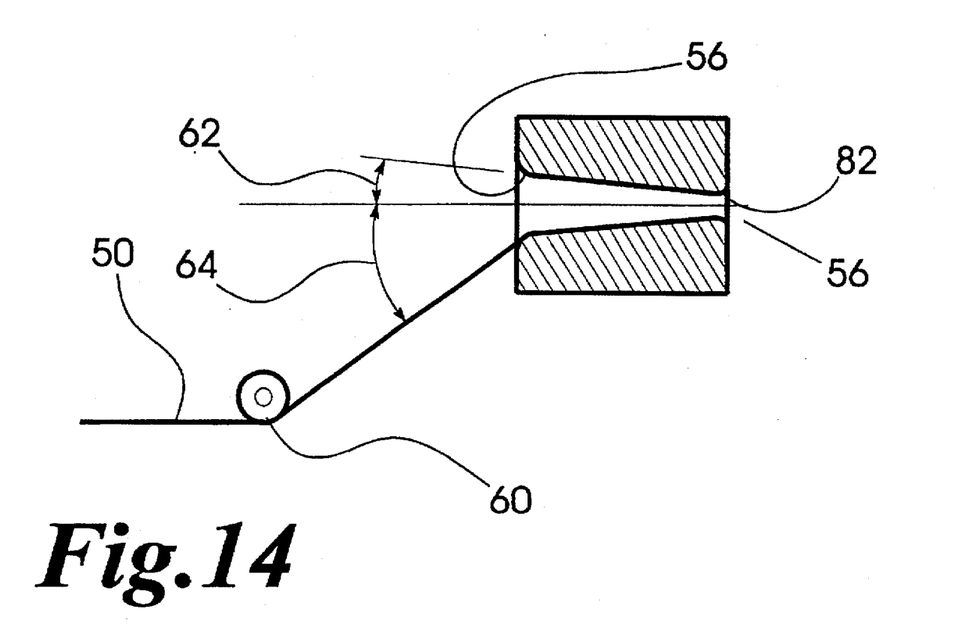
FIG. 14 is a cross sectional view of the alternative cone shaped curling die of FIG. 13.

After, fibrous strands 30 are laid on laminated ribbon 48 and adhesively attached at roller 32, the fiber reinforced laminated ribbon 50 (also shown in FIG. 8a) which still has exposed adhesive on the surface is then fed at a critical angle 64 of about 10° to 40°, but preferably from 20° to 30°, through a tapered, cone shaped, circular cross-section die 34 having a specific geometry suitable for curling the fiber and adhesive coated surface inward upon itself, as shown by reference numeral 52 in FIG. 2, so that the curled fiber reinforced ribbon 54, also shown in FIG. 8b, will adhere to itself. Interior geometry of the cone shaped circular die 34 is shown in FIG. 5 where the angle 62 of the cone is from about 10° to 20°. The entrance to the cone shaped circular die 34 has a radius 56. On the interior of the die 34, the cone 74 extends about three-quarters of the way into the die, then radius surface 58 leads into a straight or tubular portion 76 of the die. Alternatively cone 74, as shown in FIG. 13, can extend all the way through the die 78, so it terminates at the exit orifice 80 of the die. In this configuration it is preferable that the exit orifice 80 be provided with radius 82 to inhibit scoring or tearing of the ribbon 54 upon exiting the die.

Figure 9:
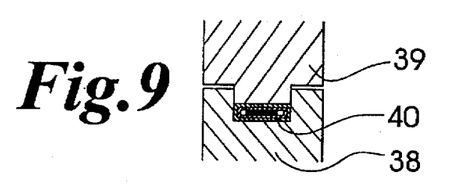
FIG. 9 is a front view of a reinforced graphite-foil strand being passed through a die.

The curled fiber reinforced ribbon 54 is fed into the final calendar protrusion die 38, 39, where it is compressed, as shown in FIG. 9, forming a finished fiber reinforced composite strand 40 of expanded graphite flake having suitable tensile strength, flexibility, and toughness to permit braiding, weaving and other processing, making it commercially useful wherever a dry lubricous, strong, flexible material is desirable. The finished fiber reinforced composite strand 40 of expanded graphite flake is then collected on a roller 41.

Figure 11:
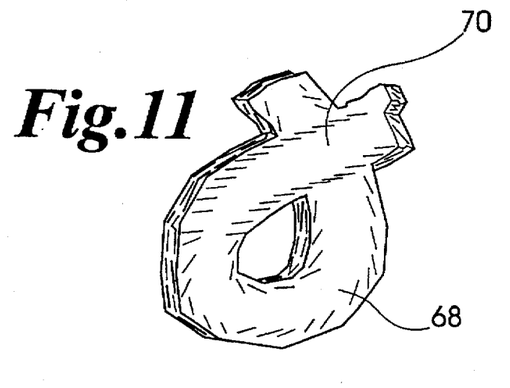
FIG. 11 is an isometric view of a gasket formed from braided graphite-foil yarn.
Figure 12:
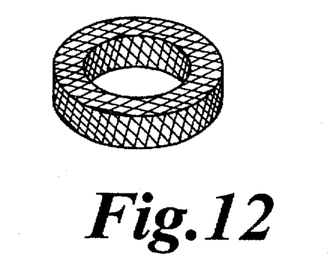
FIG. 12 is an isometric view of an endless ring gasket formed from braided graphite-foil yarn.

Fiber reinforced composite strands 40 of expanded graphite flake can then be braided together to form braided graphite-foil yarn 10 as shown in FIG. 1. This yarn can be used as is, or it can be formed into gaskets as shown in FIGS. 11 and 12.

ALTERNATIVE EMBODIMENTS

Figure 6:
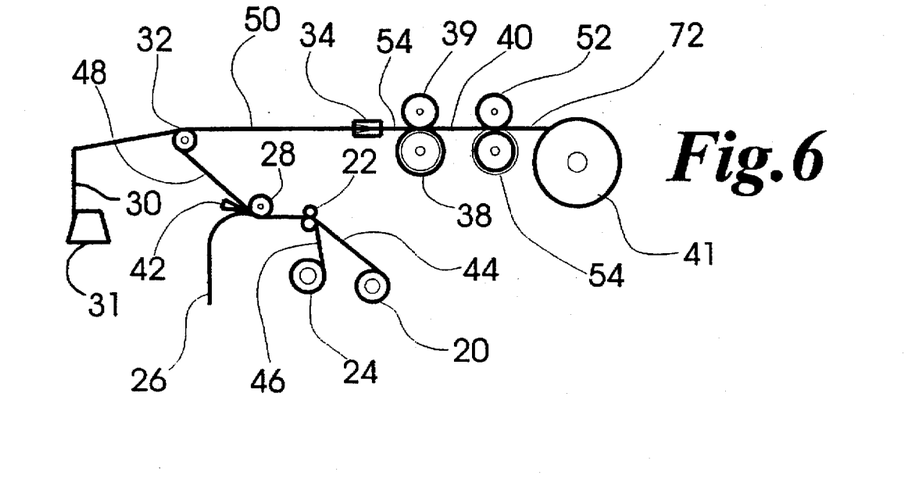
FIG. 6 is a front view illustrating an alternative embodiment for the production of a round strand of reinforced graphite-foil yarn which includes a second calendaring die.
Figure 10:
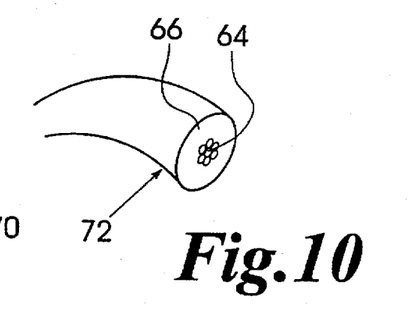
FIG. 10 is an isometric view of a round reinforced graphite-foil strand.

While a rectangular finished fiber reinforced composite strand 40 of expanded graphite flake can be produced by the apparatus depicted in FIG. 3, there are applications where it is preferable to have a round finished fiber reinforced composite strand 72 of expanded graphite flake as shown in FIG. 10. To produce such a strand, the apparatus of FIG. 3 is modified as shown in FIG. 6. The apparatus of FIG. 6 is similar to that of FIG. 3, but with the addition of protrusion die rolls 52, 53. The curled fiber reinforced ribbon 54 (FIG. 6), is fed into the first calendar protrusion die 38, 39 where it is compressed as shown in FIG. 9, forming a rectangular fiber reinforced composite strand 40 (FIG. 8c) of expanded graphite flake. In order to make a round strand, FIG. 10, the rectangular fiber reinforced composite strand 40 of FIG. 6 is fed through a second calendar protrusion die 52, 53, where it is compressed, forming a round fiber reinforced composite strand 72, as in FIG. 10, which can then be collected on the take up roller 41 of FIG. 6.

Due to the improved method of producing a reinforced strand of vermiculated natural flake graphite, when the strands are braided into a yarn, applications that were not possible before are now possible. First, when braided or woven into suitable cross sections, the material can be used as an electrically conductive joint sealant for electronic cabinetry for the purpose of providing electrical continuity for static electricity protection and as a jointing for protection for background radio interference in a Faraday Cage device. Second, in its braided, twisted or woven forms, reinforced vermiculated graphite yarn can be used as a jointing and sealant which can be placed into sealing cavities and compressed to form into a homogeneous mass conforming to exact geometry of the seal cavity providing a positive sealing medium. It is also capable of outstanding protection against destructive electrolytic or galvanic action on the metal surfaces by reducing the electric potential by sealing out electric current inducing electrolytes present in the sealed media, and further, (because it is highly conductive electrically) by short circuiting any possible electrochemically induced electrical current from attacking metal surfaces.

When used as a gasket or valve packing ring, the braided graphite strand can be used in two ways. First, an endless packing ring can be formed from the braided graphite material as shown in FIGS. 11 and 12. To form an endless packing ring 12, one must cut a length of braided graphite. Then one must form a ring so that the two cut ends are placed end to end. Pressure is then applied to this packing ring so that the graphite extrudes into itself to form a seemingly endless ring. Second, when not preformed, the braided graphite 10, as shown in FIG. 1, can be used on site to form a gasket of the desired size and uniform thickness. The braided graphite can be cut to the approximate length, then laid in the connection area with the ends 90, 92 overlapped. When compressed, a gasket is formed as shown in FIG. 11. Again, the graphites ability to extrude into itself allows the formation of a continuous ring. The overlapped area 70 has the same thickness as the non-overlapped areas 68. This gasket-forming process has three significant advantages: 1) each gasket can be produced as needed so that sized preformed gaskets need not be stocked; 2) the overlapped ends provide tabs which facilitate removal in tight areas; 3) gaskets of unusual size and shape can easily be configured.

Gaskets formed of the material made by the invented process can be used in pumps where the braided graphite-foil yarn acts as a heat sink in the sealing cavity allowing the pumps to run leak-free without cooling liquid flushes at peripheral shaft speeds up to 4800 ft/minute.

It has also been found that braided graphite gaskets, and other braided graphite items, stand up under extremes of temperature. They operate successfully at temperatures as low as −400° F., and at temperatures as high as 5400° F. Graphite sublimes (changes from a solid state to a gaseous state) between 6605° F. and 6687° F. (Note that while carbon is amorphous, graphite is crystalline). The preferred upper operating limit is about 2300° F.

In the present invention the reinforcing fiber is encased by both the adhesive strip and vermiculated graphite. When this combination is formed into a finished composite strand 40, and then braided into the form shown in FIG. 1, vermiculated graphite is in contact with only vermiculated graphite during braiding, a significant advance.

Vermiculated graphite is a relatively fragile material. Even when it is in ribbon form, it is more prone to break than it is to curl. This invention provides an adhesive film which attaches a reinforcing fiber strand to the vermiculated graphite. This adhesive film is positioned between the ribbon of vermiculated graphite and the reinforcing strand to form a laminate. The adhesive film inputs to the vermiculated graphite a more flexible characteristic than it has by itself. When this laminate is then curled and compressed, it yields a composite strand 40 which can easily be braided into a finished product as shown in FIG. 1. The finished product of FIG. 1 possesses superior performance characteristics because it is made from a composite configured in this manner.

Post treatment of the braided graphite packing in an oxygen free environment, removes all impurities at a temperature suitable to carbonize the adhesive and plastic. This treatment also prevents volume reduction in high temperature applications.

EXAMPLES

The following table shows the results of a one-year test of seals made in accordance with the present invention. These seals are of the braided carbon fiber reinforced graphite packing described above. This test was performed by a major United States petroleum refinery. The equipment used in the testing was a Foxboro Century OVA-128 portable hydrocarbon detector operated in accordance with EPA reference method 21. Summarizing the results, two hundred eighty two (282) individual tests were performed in which ninety nine percent (99%) of the braided graphite-packing tested had less than five hundred (500) parts per million emission rate, which is the current EPA standard. Ninety six percent (96%) of the packing tested had less than sixty three (63) parts per million. Note, the 1997 EPA standard is one hundred (100) parts per million for valve applications of this type. Fifty six percent (56%) of the packing tested rated an emission of zero (0) parts per million. The engineer associated with this test noted that not a single sample of the packing set was installed according to factory specifications and that it still worked. It was this engineer's observation that the feed valves which maintain readings over one hundred (100) parts per million may have had some type of mechanical defect or excessive corrosion.

TABLE 1

| Sample | Valve Type | Service | Press. PSI | Temp. °F. | Leak Rate PPMv | | | |
|---|---|---|---|---|---|---|---|---|
| | | | | | 3093 | 4093 | 1094 | 2094 |
| 1 | Gate 3/4" | Butane | 50 | 70 | 0 | — | — | — |
| 2 | Gate 3/4" | Butane | 50 | 70 | 0 | — | — | — |
| 3 | Gate 3/4" | Butane | 50 | 70 | 0 | — | — | — |
| 4 | Gate 3/4" | Butane | 50 | 70 | 0 | — | — | — |
| 5 | Cntrl 2" | H2 | 3000 | 180 | 0 | 0 | 9 | 4 |
| 6 | Cntri 2" | H2 | 3000 | 180 | 0 | 0 | 8 | 4 |
| 7 | Cntrl 2" | H2 | 3000 | 180 | 0 | 0 | 3 | 4 |
| 8 | Gate 6" | Gasoline | 15 | 275 | 1 | 4 | 5 | 62 |

TABLE 1-continued

|  |  |  | Press. | Temp. | Leak Rate PPMv | | | |
|---|---|---|---|---|---|---|---|---|
| Sample | Valve Type | Service | PSI | °F. | 3093 | 4093 | 1094 | 2094 |
| 9 | Gate 6" | Gasoline | 45 | 275 | 0 | 0 | 2 | 5 |
| 10 | Gate 8" | — | — | — | 0 | 7 | 2 | 8 |
| 11 | Gate 2" | — | — | — | 0 | 0 | 2 | 4 |
| 12 | Gate 2" | — | — | — | 0 | 0 | 2 | 4 |
| 13 | Gate 3/4" | — | — | — | 0 | 0 | 2 | 4 |
| 14 | Gate 2" | — | — | — | 0 | 0 | 2 | 4 |
| 15 | Gate 4" | Fuelgas | 65 | 60 | 0 | 0 | 2 | 4 |
| 16 | Cntrl 3" | Fuelgas | 65 | 60 | 0 | 0 | 2 | 4 |
| 17 | Gate 4" | Fuelgas | 30 | 60 | 0 | 0 | 2 | 4 |
| 18 | Gate 4" | Fuelgas | 65 | 60 | 0 | 0 | 2 | 4 |
| 19 | Gate 6" | — | — | — | 0 | 0 | 31 | 4 |
| 20 | Gate 6" | — | — | — | 0 | 0 | 45 | 30 |
| 21 | Gate 3/4" | — | — | — | 0 | 0 | 14 | 8 |
| 22 | Gate 3/4" | — | — | — | 0 | 0 | 20 | 6 |
| 23 | Gate 6" | Gasoline | 375 | 675 | 0 | 0 | 2 | 4 |
| 24 | Gate 6" | Gasoline | 375 | 675 | 0 | 0 | 2 | 4 |
| 25 | Gate 6" | Gasoline | 375 | 675 | 0 | 0 | 0 | 5 |
| 26 | Gate 6" | Gasoline | 375 | 675 | 0 | 0 | 0 | 4 |
| 27 | Cntrl 6" | Sourgas | 300 | — | 19 | 0 | 2360 | — |
| 28 | Cntrl 2" | H2 | 1500 | — | 15 | 9 | — | — |
| 29 | _ 2" | Fuelgas | 100 | 50 | 0 | 0 | 4 | — |
| 30 | Gate 3" | Fuelgas | 100 | 50 | 22 | 0 | 20 | 0 |
| 31 | Gate 3" | Fuelgas | 100 | 50 | 300 | 0 | 12 | — |
| 32 | Gate 3" | Fuelgas | 100 | 50 | 0 | 0 | 7 | — |
| 33 | Gate 2" | Fuelgas | 100 | 50 | 0 | 0 | 5 | — |
| 34 | Cntrl 3" | Fuelgas | 100 | 50 | 143 | 7 | 60 | — |
| 35 | Gate 2" | Hc | 5 | 100 | — | 0 | 4 | — |
| 36 | Gate 2" | Hc | 5 | 100 | — | 0 | NA | NA |
| 37 | Gate 3/4" | Hc | 5 | 100 | — | 0 | 4 | — |
| 38 | Gate 1" | VentGas | 5 | 100 | — | 0 | 4 | — |
| 39 | Gate 3/4" | VentGas | 5 | 100 | — | 0 | 4 | — |
| 40 | Gate 3/4" | VentGas | 3 | 100 | — | 0 | 5 | — |
| 41 | Gate 3/4" | VentGas | 3 | 100 | — | 0 | 5 | — |
| 42 | Cntrl 1.5" | VentGas | 5 | 100 | — | 0 | 4 | — |
| 43 | Gate 3" | VentGas | 5 | 100 | — | 0 | 5 | — |
| 44 | Gate 2" | Hc | 5 | 100 | — | 0 | 4 | — |
| 45 | Gate 3" | Propane | 50 | 30 | 5 | 17 | 1 | 0 |
| 46 | Gate 1.5" | Propane | 50 | 50 | 2 | 1 | 0 | 0 |
| 47 | Gate 3/4" | Propane | 50 | 60 | 0 | 0 | 0 | 0 |
| 48 | Gate 2" | Propane | 50 | 60 | 0 | 0 | 0 | 1 |
| 49 | Gate 1.5" | Propane | 50 | 30 | 0 | 0 | 0 | 0 |
| 50 | Gate 3/4" | Propane | 50 | 30 | 0 | 0 | 0 | 0 |
| 51 | Gate 3" | Propane | 50 | 30 | 0 | 0 | 0 | 0 |
| 52 | Gate 1" | Propane | 50 | 60 | 0 | 0 | 0 | 0 |
| 53 | Gate 3/4" | Propane | 50 | 60 | 0 | 0 | 0 | 0 |
| 54 | Gate 1" | Propane | 50 | 60 | 7 | 0 | 1 | 0 |
| 55 | Gate 1" | Propane | 50 | 60 | 0 | 0 | 0 | 0 |
| 56 | Gate 3/4" | Propane | 50 | 60 | 0 | 0 | 0 | 0 |
| 57 | Gate 3" | Propane | 50 | 30 | 0 | 0 | 0 | 0 |
| 58 | Gate 3" | Propane | 50 | 30 | 2 | 2 | 112 | 411 |
| 59 | Gate 3" | Propane | 15 | 40 | 0 | 0 | 0 | 0 |
| 60 | Gate 3" | Propane | 15 | 40 | 0 | 0 | 1 | 6 |
| 61 | Gate 3/4" | Propane | 100 | 60 | 0 | 0 | 0 | 0 |
| 62 | Gate 3" | Propane | 10 | 60 | 0 | 31 | 210 | 3 |
| 63 | Globe 3" | Propane | 10 | 60 | 0 | 0 | 0 | 2 |
| 64 | Globe 3" | Propane | 10 | 60 | 0 | 0 | 0 | 0 |
| 65 | Gate 3" | Propane | 10 | 60 | 10 | 0 | 46 | 2 |
| 66 | Gate 3" | Propane | 10 | 60 | 0 | 0 | 2 | 0 |
| 67 | Gate 2" | Propane | 10 | 60 | 0 | 0 | 0 | 115 |
| 68 | Gate 1.5" | Solvent | 30 | 120 | 15 | 0 | 1 | 2 |
| 69 | Cntrl 6" | StripFeed | — | — | 386 | 11 | 0 | 1 |
| 70 | Needle 1/4" | Refrmate | 200 | 1000 | 0 | 6 | 12 | 29 |
| 71 | Plug 1" | Refrmate | 200 | 1010 | 0 | 3 | 1985 | 499 |
| 72 | Gate 3/4" | Refrmate | 200 | 1010 | 15 | 12 | 0 | 103 |
| 73 | Gate 6" | Fuel Gas | 80 | 80 | 1 | 1 | 0 | 0 |
| 74 | Gate 6" | Refrmate | 300 | 100 | 0 | 0 | 0 | 2 |
| 75 | Gate 3" | LPG | 200 | 100 | 0 | 0 | 1 | 0 |
| 76 | Cntrl 6" | Refrmate | 200 | 100 | 0 | 0 | 0 | 0 |
| 77 | Gate 3/4" | FuelGag | 30 | 70 | — | 200 | 0 | — |
| 78 | Cntrl 2" | LPG | 400 | 70 | 0 | 1 | 1 | 1 |
| 79 | Cntrl 1" | LPG | 400 | 70 | 0 | 1 | 1 | 0 |
| 80 | Cntrl 2" | LPG | 400 | 70 | 0 | 10 | 2 | 16 |
| 81 | Gate 3" | LPG | 400 | 70 | 9 | 7 | 0 | 0 |
| 82 | Cntrl 8" | ProcGas | 225 | 70 | 0 | 21 | — | — |

SUMMARY OF THE ACHIEVEMENT OF THE OBJECTS OF THE INVENTION

From the foregoing, it is readily apparent that I have invented an improved method of producing a strand of reinforced graphite-foil yarn which is the basis of the braided graphite-foil yarns. Also encompassed is a method of curling the fiber and adhesive coated surface inward upon itself, so that the curled ribbon will adhere to itself when compressed into the final protrusion die forming a finished fiber reinforced composite strand of expanded graphite flake. This method ensures the full encapsulation of adhesive and reinforcing fibers, preventing these areas from becoming a leak path when the material is used as a seal. Full encapsulation also protects the adhesive and reinforcing fibers from chemical exposure and insures structural integrity at high temperatures. Utilizing this method braided graphite-foil yarns can be produced faster and more economically than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A fiber reinforced composite strand comprising:

a core comprising at least one reinforcing fiber;

a layer of adhesive film having a first adhesive side and a second adhesive side, said first adhesive side in contact with said core;

said core and said layer of adhesive film encapsulated by a jacket comprising:

a layer of vermiculated graphite in contact with said second adhesive side of said layer of adhesive film.

2. A fiber reinforced composite strand according to claim 1 wherein said at least one reinforcing fiber is selected from the group consisting of: carbon fiber, Inconel wire, aluminum wire, steel wire, hemp, string, nylon fiber, glass fiber, quartz fiber, liquid silicone fiber having greater than 90% $SiO_2$ and aromatic polyamide fiber.

3. A fiber reinforced composite strand according to claim 1 wherein said at least one reinforcing fiber is carbon fiber.

4. A fiber reinforced composite strand according to claim 1 wherein said layer of adhesive film is selected from the group consisting of: polyester, cellophane, acrylic, polyethylene teraphthalate, woven fiber, paper, cloth, plastic, and fiber impregnated plastic.

5. A fiber reinforced composite strand according to claim 1 wherein said layer of adhesive film is plastic.

6. A fiber reinforced composite strand comprising:

an elongated film having a first adhesive side and a second adhesive side;

a vermiculated graphite ribbon having a first side and a second side, said first side in contact with said first adhesive side of said elongated film;

a core comprising at least one reinforcing fiber and in contact with said second adhesive side of said elongated film;

wherein said fiber reinforced composite strand is formed by the process of:

feeding said core, said elongated film and said vermiculated graphite ribbon through a die having a frustoconical passage way so that said vermiculated graphite ribbon is curled inward upon itself and about said core to form a jacket which fully encapsulates said core and said elongated film.

7. A fiber reinforced composite strand according to claim 6 wherein said at least one reinforcing fiber of said core is selected from the group consisting of: carbon fiber, Inconel wire, aluminum wire, steel wire, hemp, string, nylon fiber, glass fiber, quartz fiber, liquid silicone fiber having greater than 90% $SiO_2$ and aromatic polyamide fiber.

8. A fiber reinforced composite strand according to claim 7 wherein said at least one reinforcing fiber of said core is carbon fiber.

9. A fiber reinforced composite strand according to claim 7 wherein said elongated film is selected from the group consisting of: polyester, cellophane, acrylic, polyethylene teraphthalate, fiber or plastic.

10. A fiber reinforced composite strand according to claim 7 wherein said elongated film is plastic.

11. A fiber reinforced composite strand according to claim 6 wherein said fiber reinforced composite strand is formed by the further process of compressing said core, said elongated film, and said vermiculated graphite ribbon into a substantially flat fiber reinforced composite strand.

12. A fiber reinforced composite strand which comprises:

a ribbon of vermiculated graphite having a first side and a second side;

a plastic adhesive film having a first side and a second side, each of said first side and said second side having an adhesive surface, said second side further having a protective film thereon, said first side laminated to said first side of said ribbon of vermiculated graphite and said protective film stripped away to expose said second side of said plastic adhesive film;

a reinforcing fiber laid on said exposed second side of said plastic adhesive film; and said reinforcing fiber and said plastic adhesive film fully encapsulated by a jacket comprising a single layer of said ribbon of vermiculated graphite to form the fiber reinforced composite strand.

13. A fiber reinforced composite strand according to claim 12 further compressed into a substantially flat fiber reinforced composite strand.

* * * * *